United States Patent

[11] 3,582,965

[72] Inventor John S. DeMetrick
Lexington, Mass.
[21] Appl. No. 599,887
[22] Filed Dec. 7, 1966
[45] Patented June 1, 1971
[73] Assignee Automatic Radio Manufacturing Co., Inc.
Melrose, Mass.

[54] TAPE CARTRIDGE PLAYER WITH TUNER CARTRIDGE
12 Claims, 3 Drawing Figs.

[52] U.S. Cl. .......... 179/100.11, 179/100.2Z, 325/311
[51] Int. Cl. .......... G11b 1/04, G11b 31/00, H04b 1/06
[50] Field of Search .......... 325/311; 179/100.11, 100.2 Z

[56] References Cited
UNITED STATES PATENTS 2,662,975 12/1953 Schwarz .......... 179/100.11

*Primary Examiner*—Bernard Konick
*Assistant Examiner*—J. Russell Goudeau
*Attorney*—Wolf, Greenfield and Hieken

ABSTRACT: A tunable radio receiver is constructed in a form which permits it to be interchanged in a tape player with the conventional magnetic tape cartridge. The tunable radio receiver includes an output circuit having a magnetic coupler that is juxtaposed to the pickup head in the tape player when the radio receiver is inserted into the tape player. The coupler inductively couples signals to the pickup head to cause radio transmissions received by the radio receiver to be audibly reproduced through the tape player. The tunable radio receiver is arranged to obtain all its operating power through a pair of contacts in the tape player which are normally used to actuate a mechanism to reposition the pickup head after it has completely scanned a track on a multitrack magnetic tape. The tunable radio receiver has provisions for permitting it to connect to an external antenna. Further, the tunable radio receiver is arranged to actuate a switch to disable the tape drive motor in the tape player when the radio receiver is inserted into the player.

INVENTOR.
JOHN S. De DEMETRICK
BY
Wolf, Greenfield & Hieken
ATTORNEYS

TAPE CARTRIDGE PLAYER WITH TUNER CARTRIDGE

BACKGROUND OF THE INVENTION

The present invention relates in general to vehicular sound reproducing systems and more particularly concerns a tape player including a removable tuner cartridge that fits into the space normally occupied by a tape cartridge and receives its power from contacts already in the tape player. These contacts are the ones arranged to be interconnected by a conducting segment of the tape signifying the end of the tape for displacing the tape scanning head to scan another channel along the tape until the conducting segment again interconnects the tape player contacts.

Vehicular tape playing systems have met with wide acceptance because of the high quality of sound reproduction provided of program material selected by the listener. However, these tape players have some disadvantages. If the user also wants to listen to radio programs, the vehicle must also include a regular vehicular radio, including audio amplification and reproduction portions that duplicate the functions of those associated with the tape reproducing system, but normally with less quality. If the user elects not to have a vehicular radio receiver, then his program source material is limited to that on his tape cartridges.

SUMMARY OF THE INVENTION

Accordingly, it is an important object of this invention to provide the owner of a tape reproducing system with the means for enjoying radio programs reproduced through the relatively high quality tape reproducer system without taking hardly any additional space in the vehicle, with relatively little additional cost and without duplicating audio amplification elements in the tape reproducing system.

It is another object of the invention to achieve the preceding object with reliable compact equipment relatively low in cost.

It is still a further object of the invention to achieve the preceding objects while enabling the listener to choose a wide variety of receivable program material.

According to the invention, a commercially available tape reproducing system receives a cartridge embodying a radio tuner for providing a detected radio signal. The cartridge includes means for inductively coupling the detected radio signal to the scanning head of the tape reproducing system. Preferably, the cartridge tuner also includes contact means for receiving power from the tape reproducer for energizing the tuner and means for coupling to an external antenna. Preferably, the contact means engages contacts of the tape reproducer adapted for interconnection by a conductive segment on a tape being scanned that signifies the end of a scanning cycle for relatively displacing the head and tape to initiate scan of a different channel on the tape.

Numerous other features, objects and advantages of the invention will become apparent from the following specification when read in connection with the accompanying drawing in which:

Figures 1, 3:
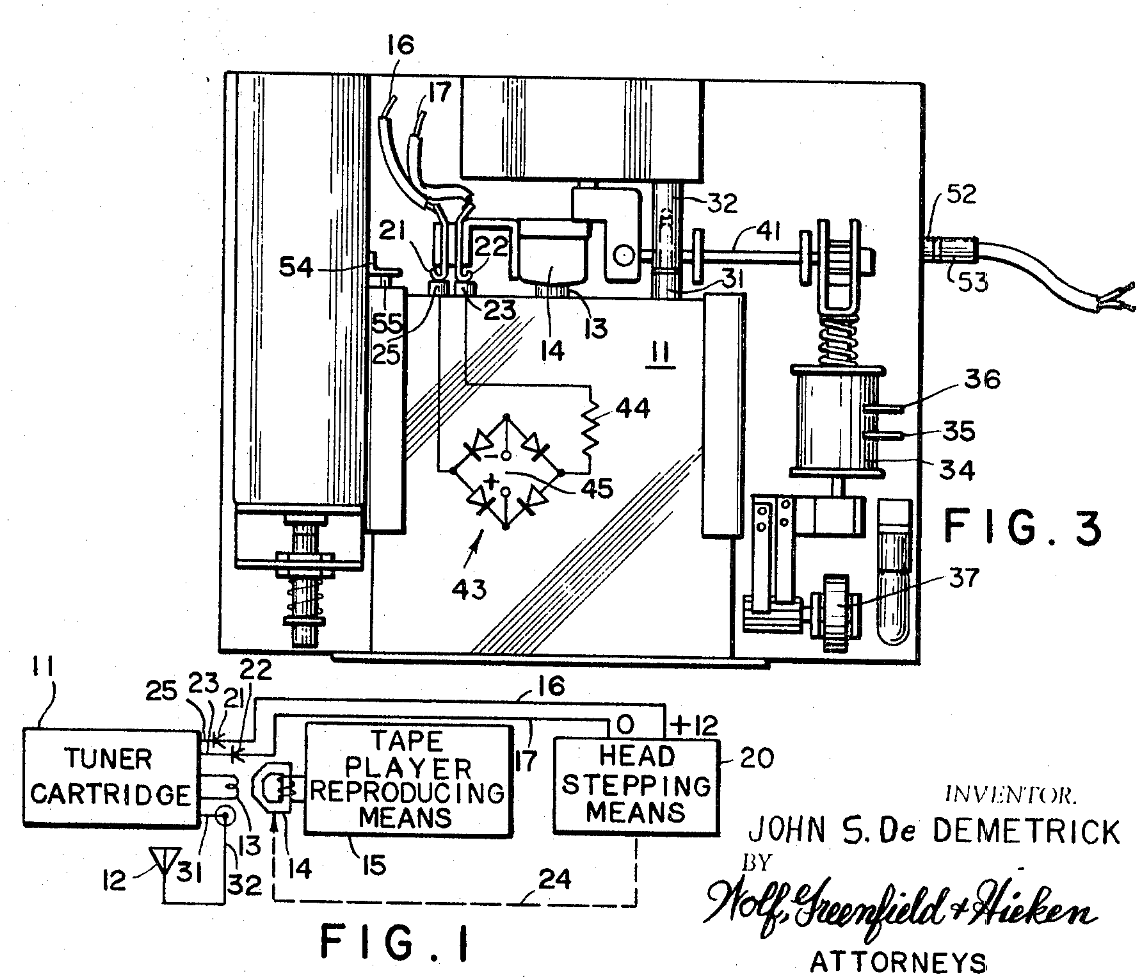
FIG. 1 is a combined block-schematic diagram generally illustrating the logical arrangement of a system according to the invention.
FIG. 3 is a top view of the arrangement of FIG. 1, but with a bridge circuit feature schematically represented.

With reference now to the drawing and more particularly to FIG. 1 thereof, there is shown a combined block-schematic diagram of a system according to the invention. A plug-in tuner cartridge 11 amplifies and detects a signal received by antenna 12 to provide an audio signal at output winding 13 that is inductively coupled to magnetic pickup head 14 and amplified and reproduced by tape player reproducing means 15. Preferably operating power for the tuner cartridge 11 is provided over lines 16 and 17, typically at +12 and 0 volts, respectively, from head stepping means 20 associated with a conventional vehicular tape reproducer through contacts 21 and 22, respectively. The latter pair of contacts are those interconnected by a conducting segment on a typical 8-track endless stereo tape signifying the end of a pair of tracks to cause head stepping means 20 to displace head 14 through mechanical coupling means 24 transversely to the direction of scanning so that the next pair of tracks are then scanned. This operating power is received through contacts 25 and 26 associated with tuner cartridge 11. Tuner cartridge 11 may include a jack 31 for receiving an antenna plug 32.

Figure 2:
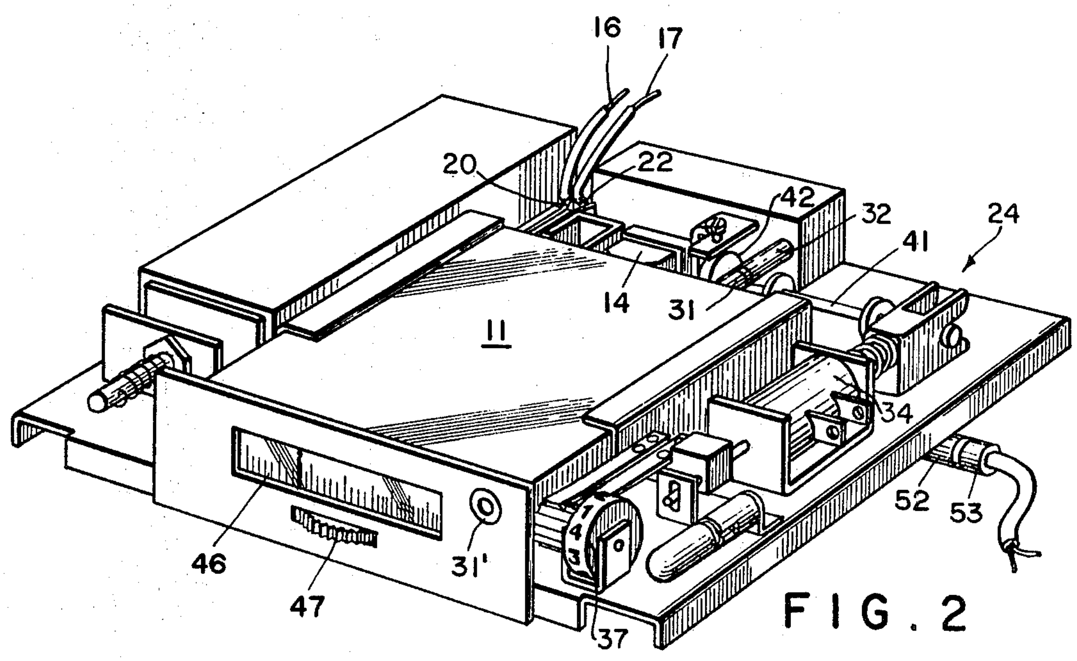
FIG. 2 is a perspective view of a physical tape reproducer with a tuner cartridge according to the invention.

Referring to FIGS. 2 and 3 there are shown respective perspective and top views essentially of the commercially available Automatic Radio-type CSE-3281 multiple track stereo tape player illustrating how a tuner cartridge 11 according to the invention fits into the same channel that accommodates a tape cartridge. Since specific circuitry for accomplishing the tuning and detection is well known in the radio receiving art, no description of such circuitry is included here so as not to obscure the principles of the invention. The detected audio signal after amplification may be applied to inductor 13. Inductor 13 could be another pickup head like pickup head 14 in close physical proximity as shown to establish inductive coupling therebetween so that inductor 13 acts as a magnetic coupler and coacts with pickup head 14 to cause the magnetic coupler and the pickup head to effectively function as an audio interstage transformer between tuner cartridge 11 and the tape player reproducing means 15 with inductor 13 being the primary and pickup head 14 being the secondary.

Tuner cartridge 11 receives its power through fixed contacts 23 and 25 arranged to contact the "candy cane" contacts 21 and 22 of the tape reproducer that normally function to be interconnected by a conducting segment on an endless tape in a tape cartridge that signifies the end of a pair of tracks just previously scanned to energize solenoid 34 through means including solenoid leads 35 and 36. Energization of solenoid 34 is accompanied by the stepping of indicator wheel 37 to display the new channel then being scanned and rotation of head stepping shaft 41 which in turn causes head stepping cam 42 to displace head 14 by an increment in a direction transverse to the scanning direction so that the next pair of tracks is scanned. The potential between candy cane contacts 21 and 22 is typically the full 12 volts available from the battery of most modern vehicles. When these terminals are directly interconnected by the conducting segment of the type being scanned, considerable current flows through solenoid winding 34. However, when these terminals are interconnected through contacts 23 and 25, the diode bridge 43 and current limiting resistor 44, the current flowing through winding 34 is too small to actuate the solenoid plunger. The solenoid winding 34 then provides filtering action to help decouple the tuner circuitry from the audio amplification circuitry of the tape reproducing system.

Diode bridge 43 functions to establish the proper polarity between tuner power source electrodes 45, regardless of the relative polarity of the potential between candy cane contacts 21 and 22. Thus the invention may be used with virtually any tape reproducer player having standard head stepping contacts and a standard pickup head.

Tuner cartridge 11 preferably includes a conventional tuning dial 46 with tuning accomplished by actuating thumb wheel 47. This actuation in turn moves a tuning capacitor or inductor by suitable well-known techniques.

As illustrated tuner cartridge 11 is arranged with tuner antenna jack 31 at the rear engaging tape reproducer antenna plug 32 which is fixed in position where it is engaged by the jack 31 when the tuner cartridge is inserted into the tape player. The plug 32 is electrically connected to the jack 52 which receives a conventional antenna plug 53 that is connected to the vehicle antenna. This arrangement is preferred because the user need only plug in the tuner cartridge 11 to automatically connect power, antenna and tape reproducer audio amplifier stages to the tuner. Since many tape reproducer players may not have such a fixed antenna plug, cartridge 11 may also be equipped with a supplementary antenna jack 31' on the front for receiving an antenna plug inserted by the user. This antenna plug may usually remain in the jack 31', even when the cartridge is removed, for the cartridge may conveniently be stored in a suitable receptacle underneath the vehicle dashboard.

Preferably the tape reproducer would also include a microswitch 54 activated by projection 55 on tuner cartridge 11 for deenergizing the tape drive motor when a tuner cartridge is in position. Switch 54 would then be a normally closed switch in series with the source of driving power to the tape drive motor that is opened only when the tuner cartridge projection 55 actuates it. Although this feature is desirable, it is not essential, and a conventional tape reproducer could still reproduce sound provided by the tuner cartridge while the tape motor continued to run.

Tuner cartridge 11 could be an A-M cartridge, an F-M cartridge, a short wave cartridge especially adapted for receiving amateur, foreign, aircraft, police or fire broadcasts or combinations thereof. The invention affords a number of advantages. It is relatively compact and low in cost because so many portions of the tape reproducer are advantageously employed in the system. It provides a flexible source of programs. It provides the user with the high quality reproduction of the tape player reproducing system for radio broadcasts without taking the space normally associated with a conventional vehicular receiver.

It is evident that those skilled in the art may now make numerous other uses and modifications of and departures from the specific embodiments described herein without departing from the inventive concepts. Consequently, the invention is to be construed as embracing each and every novel feature and novel combination of features present in or possessed by the apparatus and techniques disclosed herein and limited solely by the spirit and scope of the appended claims.

What I claim is:

1. In combination with a tape player instrument of the type provided with a slot adapted to receive a tape cartridge and a magnetic pickup head for cooperation with the tape in said cartridge, radio receiver means constructed in the form of a cartridge adapted to be received in the slot in the tape player, said radio receiver means having an output circuit including a coupling means, said coupling means coming into juxtaposition relative to the pickup head, to provide magnetic coupling therebetween, when the receiver means is inserted into said slot, whereby the radio reception is reproduced through the tape player.

2. For use with a tape player instrument of the type provided with a slot adapted to receive a tape cartridge, a magnetic pickup head for cooperation with the tape in said cartridge and a pair of normally disconnected contacts for cooperation with a conducting segment on said tape to interconnect said contacts and electrically energize a means for displacing said pickup head to cause the latter to scan another channel on said tape, apparatus comprising:

electronic circuit means constructed in the form of a cartridge adapted to be received in the slot in the tape player, said electronic circuit means having a pair of power receiving contacts for engagement with respective ones of said pair of normally disconnected contacts when said electronic circuit means is in said slot, said electronic circuit means having means for receiving all its operating power through said power receiving contacts and including means for limiting the current drawn through said power receiving contacts to a value less than that required to cause said means for displacing to displace said pickup head, said electronic circuit means having an output circuit including coupling means, said coupling means coming into juxtaposition relative to the input of said tape player to electrically intercouple the latter input and said output circuit when the electronic circuit means is inserted into said slot, whereby sound signals are reproduced through the tape player while the electronic circuit means receives all its operating power through said pair of normally disconnected contacts when the electronic circuit means is inserted into said slot.

3. Apparatus in accordance with claim 2 wherein said electronic circuit means further includes rectifier means coupled to said power receiving contacts for providing operating DC power of the same predetermined polarity to the amplification and detection circuits of said electronic circuit means regardless of the relative polarity of the potential between said pair of power receiving contacts.

4. Apparatus in accordance with claim 2 wherein said electronic circuit means comprises a radio receiver.

5. Apparatus in accordance with claim 3 wherein said electronic circuit means comprises a radio receiver.

6. For use with a tape player of the type having a magnetic pickup head:

means to position a cartridge containing a magnetic tape relative to the magnetic pickup head to permit that head to scan the magnetic tape, and an audio amplifier for converting signals derived from the pickup head into sound, a tunable radio receiver constructed in a form permitting it to be interchanged in the tape player with the tape cartridge, the radio receiver including an output circuit having a magnetic coupler which is juxtaposed to the pickup head when the radio receiver is positioned in the tape player, the coupler inductively coupling signals to the pickup head to cause radio transmissions received by the radio receiver to be audibly reproduced through the tape player.

7. A tunable radio receiver according to claim 6, wherein the radio receiver further includes:

a pair of power receiving contacts, and rectifier means connected to the power receiving contacts, the rectifier means being arranged to rectify the current drawn through those contacts to provide DC power of a predetermined polarity to the circuits in the radio receiver regardless of the polarity of electrical potential existing between those contacts.

8. In combination with a tape player of the type having:

a magnetic pickup head, means to position a cartridge containing a magnetic tape relative to the magnetic pickup head to permit that head to scan the magnetic tape, and an audio amplifier for converting signals derived from the pickup head into sound, a tunable radio receiver constructed in a form permitting it to be interchanged in the tape player with the tape cartridge, the radio receiver including an output circuit having a magnetic coupler which is juxtaposed to the pickup head when the radio receiver is positioned in the tape player, the coupler inductively coupling signals to the pickup head to cause radio transmissions received by the radio receiver to be audibly reproduced through the tape player.

9. In the combination of a tape player and radio receiver according to claim 8 wherein the tape player is of the type which further includes:

electrically energizable head displacement means for causing the pickup head to be moved to a position where it can scan another track on a multitrack tape in the cartridge, a pair of normally disconnected contacts between which an electric potential exists, the contacts cooperating with a conducting segment on the magnetic tape which acts to bridge the contacts whereby to electrically energize the means for displacing the pickup head, and the radio receiver has a pair of power receiving contacts which engage the pair of normally disconnected contacts of the tape player when the radio receiver is positioned in the tape player, the radio receiver thereby receiving all its operating power through the mated contacts and including means for limiting the current drawn through those contacts to a value less than that required to cause energization of the head displacement means.

10. In the combination of a tape player and a tunable radio receiver in accordance with claim 9, further including the improvement wherein:

the radio receiver has rectifier means coupled to the power receiving contacts for supplying DC power of a predetermined polarity to circuits in the radio receiver regardless of the polarity of the electric potential existing between the normally disconnected contacts in the tape player.

11. In the combination of a tape player and a tunable radio receiver in accordance with claim 9, further including the improvement wherein:

the tape player has a connection to an external antenna and the tunable radio receiver has means which couple to the antenna connection in the tape player upon insertion of the radio receiver into the tape player.

12. In the combination of a tape player and a tunable radio receiver in accordance with claim 9, further including the improvement wherein:

the tape player has a switch which, when actuated, disables the tape drive motor in the tape player, and the tunable radio receiver is arranged to actuate the switch when the radio receiver is positioned in the tape player.